United States Patent
Namiki (10) Patent No.: US 7,305,683 B2
(45) Date of Patent: Dec. 4, 2007

(54) DISK ROTATION DEVICE AND DISK DRIVE DEVICE

(75) Inventor: Tomokazu Namiki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 387 days.

(21) Appl. No.: 11/043,258

(22) Filed: Jan. 27, 2005

(65) Prior Publication Data

US 2005/0188389 A1   Aug. 25, 2005

(30) Foreign Application Priority Data

Feb. 4, 2004   (JP)   ............................ 2004-027883

(51) Int. Cl.
*G11B 17/04* (2006.01)
(52) U.S. Cl. ..................................... 720/610
(58) Field of Classification Search ................ 720/601, 720/610
See application file for complete search history.

(56) References Cited

U.S. PATENT DOCUMENTS 6,980,492 B2 * 12/2005 Wei ......................... 369/30.36
7,069,564 B2 * 6/2006 Naoki ......................... 720/601
2004/0187142 A1   9/2004 Namiki
2005/0076347 A1 * 4/2005 Chiu et al. .................. 720/601

FOREIGN PATENT DOCUMENTS

| JP | 2000-231779 | 8/2000 |
|----|-------------|--------|
| JP | 2003-59251 | 2/2003 |
| JP | 2003-217276 | 7/2003 |
| JP | 2003-248998 | 9/2003 |
| JP | 2003-263879 | 9/2003 |
| JP | 2003-272368 | 9/2003 |
| JP | 2004-110927 | 4/2004 |

* cited by examiner

*Primary Examiner*—Allen Cao
(74) *Attorney, Agent, or Firm*—Dickstein Shapiro LLP (57) ABSTRACT

In a disk rotation device, a box-type housing has an opening at one end, and a tray is attached to the housing and movable between a first position, located outside the housing, where the disk is placed on the tray and a second position, located inside the housing, where the disk on the tray is rotated. A plurality of locking units lock, when the tray is in the second position, the tray to walls of the housing where surfaces of the tray face the housing walls in a direction perpendicular to a movement direction of the tray.

14 Claims, 10 Drawing Sheets

DISK ROTATION DEVICE AND DISK DRIVE DEVICE

BACKGROUND OF THE INVENTION

1. Field of the Invention

The present invention relates to a disk rotation device which rotates a disk, and a disk drive device which is provided with the disk rotation device to rotate the disk as the recording medium in the disk drive device.

2. Description of the Related Art

With the progress of the digital technique and the improvement of the data-compression technique in recent years, as the recording medium for recording information, such as music, animation, photography and illustration, the optical disks, such as CD (compact disk), and DVD (digital versatile disk) having the same disk diameter as that of CD and enabling recording the data in the quantity about 7 times that of CD, have become to attract the attention. With the low-pricing of the optical disk, the optical disk drive device in which recording data in the optical disk and reproducing of the data are carried out while the optical disk is rotated has come to spread.

The optical disk drive device is equipped with the main drive device and the tray. The main drive device includes the optical pickup which irradiates the laser beam to the optical disk, and the disk rotation device which rotates the optical disk in the rotation position. The tray is used when the optical disk is loaded to or ejected from the rotation position in the main drive device where the optical disk is rotated.

When recording the data in the optical disk, the optical disk is rotated by the disk rotation device, and the laser beam is irradiated from the optical pickup to the optical disk to form the mark region and the space region on the recording surface of the optical disk.

Moreover, when reproducing the data, the optical disk is rotated, the laser beam is irradiated from the optical pickup to the optical disk, and the reflected light from the recording surface of the optical disk is detected. At the time of recording and reproducing, the optical disk is rotated by the disk rotation device.

With the proliferation of use of the optical disks, the development of the optical disk drive device is activated and the rate of reading of the data from the optical disk is increasing. Generally, the method of increasing the rotational speed of the optical disk is adopted as the approach of increasing the rate of reading of the data.

Supposing that the reference rotational speed (which is equivalent to 200 rpm) of the early optical disk drive device is set to the 1× speed, the rotational speed higher than the 32× speed (which is equivalent to 6400 rpm) is commonly available to the recent optical disk drive device. Moreover, the latest version optical disk drive device can provide the rotational speed exceeding the 50× speed (which is equivalent to 10000 rpm) for the rotation of the optical disk.

By the way, if the rotational speed of the optical disk is increased, the optical disk drive device itself will come to vibrate. The vibration of the optical disk drive device itself becomes the factor of the vibration of the tray. Moreover, the rotation of the optical disk causes the air flow to arise with the disk rotation. At this time, the side walls of the reception portion of the tray will receive the force of the air flow directly. This also becomes the factor of the vibration of the tray.

As the rotational speed of the optical disk is increased, frequency and amplitude of the vibration of the tray become large, and this becomes one of the main sources which cause the noise of the optical disk drive device.

When the rotational speed of the optical disk is below the 10× speed, the user is not so concerned with the noise of the optical disk drive device. However, when the rotational speed of the optical disk exceeds the 32× speed, the user may feel displeasure in the noise of the optical disk drive device.

Recently, the number of the users who are sensitive to sound has been increased, and the loudness which is generated by the optical disk drive device has become to affect the sales of the optical disk drive devices.

In order to reduce the noise, there is proposed an improved the optical disk drive device which is directed to improvement in the sealing characteristic of the open/close door which opens and closes the opening provided in the front face of the main body of the device for insertion and ejection of the optical disk, so that leakage of the sound made inside the main body of the device to the outside is suppressed (for example, see Japanese Laid-Open Patent Application No. 2000-231779).

However, since the optical disk drive device disclosed in Japanese Laid-Open Patent Application No. 2000-231779 makes use of the elastic force of the elastic member integrally molded with the door, the problem of deterioration of the durability of the elastic member may arise due to the secular change of the elastic member.

Moreover, when the rotational speed of the optical disk is further increased and the vibration of the optical disk drive device itself becomes still severer, there is a possibility that the acoustic isolation effectiveness become inadequate.

SUMMARY OF THE INVENTION

An object of the present invention is to provide an improved disk rotation device in which the above-described problems are eliminated.

Another object of the present invention is to provide a disk rotation device which effectively reduces the noise accompanied with the rotation of the disk.

Another object of the present invention is to provide a disk drive device which is capable of accessing the disk at high speed while suppressing the occurrence of the noise.

In order to achieve the above-mentioned object, the present invention provides a disk rotation device which rotates a disk, the disk rotation device comprising: a box-type housing having an opening at one end; a tray which is attached to the housing and movable between a first position, located outside the housing, where the disk is placed on the tray and a second position, located inside the housing, where the disk on the tray is rotated; and a plurality of locking units locking, when the tray is in the second position, the tray to walls of the housing where surfaces of the tray face the housing walls in a direction perpendicular to a movement direction of the tray.

According to the present invention, when the tray is in the second position, the tray is locked to the walls of the housing where surfaces of the tray face the housing walls in the direction perpendicular to the movement direction of the tray by using the plurality of locking units. For this reason, even when the disk is rotated, it is possible to effectively reduce the vibration of the tray (including the swaying movement of the tray) and to reduce the noise accompanied with the rotation of the disk as a result of the reduction of the tray vibration.

The above-mentioned disk rotation device may be configured so that one of the plurality of locking units is located on one of side walls of the tray and the other locking unit is located on the other side wall of the tray where each side wall of the tray faces a side wall of the housing in the direction perpendicular to the movement direction of the tray.

The above-mentioned disk rotation device may be configured so that one of the plurality of locking units is located on one of top and bottom walls of the tray and the other locking unit is located on the other of the top and bottom walls of the tray where each wall of the tray faces one of top and bottom walls of the housing in a direction perpendicular to the movement direction of the tray and perpendicular to a surface of the disk placed on the tray.

The above-mentioned disk rotation device may be configured so that the plurality of locking units are provided so that each locking unit comprises a projecting portion disposed on one of the housing and the tray, and a surface portion disposed on the other of the housing and the tray, the projecting portion contacting the surface portion.

The above-mentioned disk rotation device may be configured so that the projecting portion of each locking unit has a rounded configuration at a position where the projecting portion contacts the surface portion.

The above-mentioned disk rotation device may be configured so that the projecting portion of each locking unit is disposed on the tray, the surface portion of each locking unit is disposed on the housing, and the surface portion has a tapered surface in which a spacing with the tray becomes narrow in an inserting movement direction of the tray from the first position to the second position.

The above-mentioned disk rotation device may be configured so that the projecting portion of each locking unit is disposed on the housing, the surface portion of each locking unit is disposed on the tray, and the surface portion has a tapered surface in which a spacing with the tray becomes narrow in an inserting movement direction of the tray from the first position to the second position.

The above-mentioned disk rotation device may be configured so that the tray comprises a restriction portion which restricts movement of the tray to a marginal limit position toward the first position, and one of the projecting portion and the surface portion is brought into contact with the restriction portion and serves as a stopper that avoids separation of the tray from the housing.

The above-mentioned disk rotation device may be configured so that at least one of the projecting portion and the surface portion provided in one of the plurality of locking units is made of an elastic material.

In order to achieve the above-mentioned object, the present invention provides a disk drive device comprising: a processing unit which records information in a disk as a recording medium, and reproduces the information from the disk; and a disk rotation device which rotates the disk during the reproduction of the information, the disk rotation device comprising: a box-type housing having an opening at one end; a tray which is attached to the housing and movable between a first position, located outside the housing, where the disk is placed on the tray and a second position, located inside the housing, where the disk on the tray is rotated; and a plurality of locking units locking, when the tray is in the second position, the tray to walls of the housing where surfaces of the tray face the housing walls in a direction perpendicular to a movement direction of the tray.

Since the disk drive device is equipped with the above-mentioned disk rotation device, the occurrence of the noise accompanied with the rotation of the disk when the information recorded in the disk is accessed with the processing unit can be suppressed. Therefore, it is possible to access the disk at high speed while suppressing the occurrence of the noise.

BRIEF DESCRIPTION OF THE DRAWINGS

Other objects, features and advantages of the present invention will be apparent from the following detailed description when reading in conjunction with the accompanying drawings.

DETAILED DESCRIPTION OF PREFERRED EMBODIMENTS

A description will now be given of the preferred embodiments of the invention with reference to the accompanying drawings.

With reference to FIG. 1 through FIG. 5, one preferred embodiment of the present invention will be explained.

Figure 1:
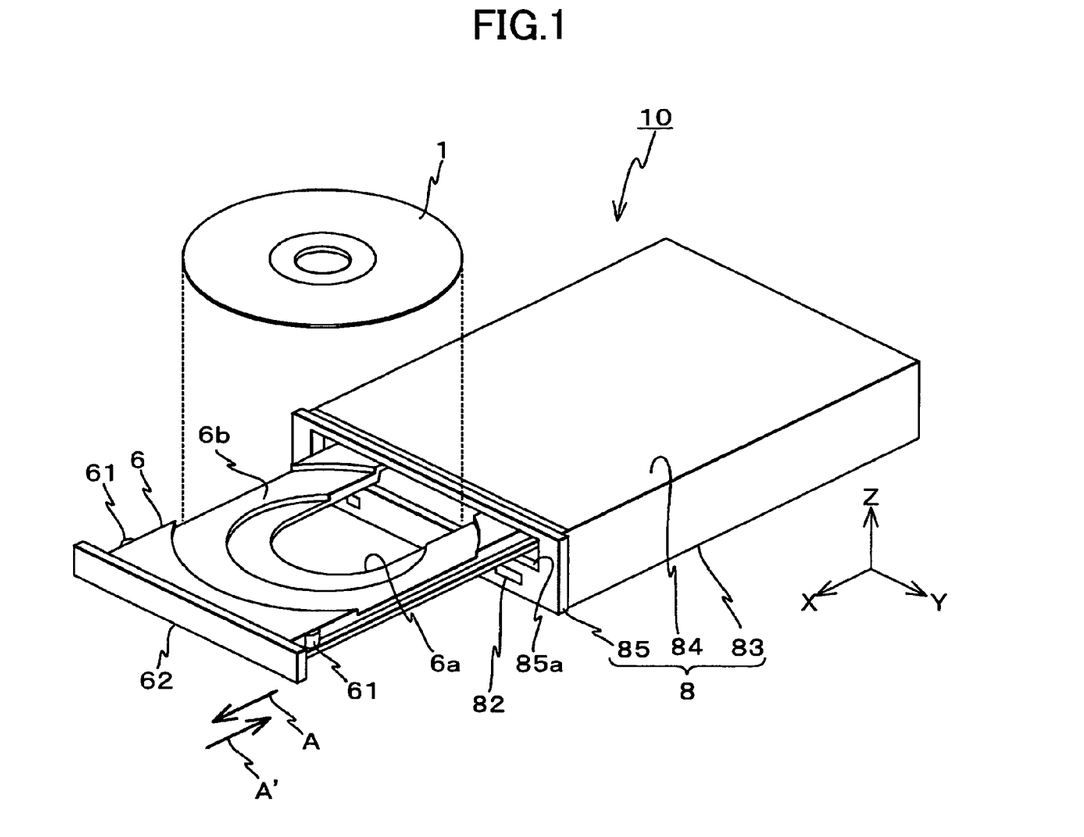
FIG. 1 is a perspective diagram showing the composition of the disk drive device in one preferred embodiment of the invention.

FIG. 1 shows the composition of the disk drive device in the preferred embodiment of the present invention.

As shown in FIG. 1, the disk drive device 10 in the present embodiment comprises the box-type housing 8 in which a rectangular opening 85a is formed at one end. The disk drive device 10 comprises the tray 6 which is attached to the housing 8 via the opening 85a and provided to be movable in the two-way directions (±X directions), indicated by the arrows A and A' in FIG. 1, between the first position outside the housing 8 where the optical disk 1 as the recording medium is set on the tray 6 and the second position inside the housing 8 where the optical disk 1 is rotated.

The disk drive device 10 further comprises the open/close door 62 which is provided to close the opening 85a when the tray 6 is inserted in the housing 8, and the processing unit (not shown) which records information in the optical disk 1 as the recording medium, erases the information in the optical disk 1, and reproduces the information from the optical disk 1. In the present embodiment, it is assumed that the recording medium which is in conformity with the CD type specifications, such as CD-R (CD-recordable) and CD-RW (CD-rewritable), is used as an example of the optical disk 1.

Figure 2:
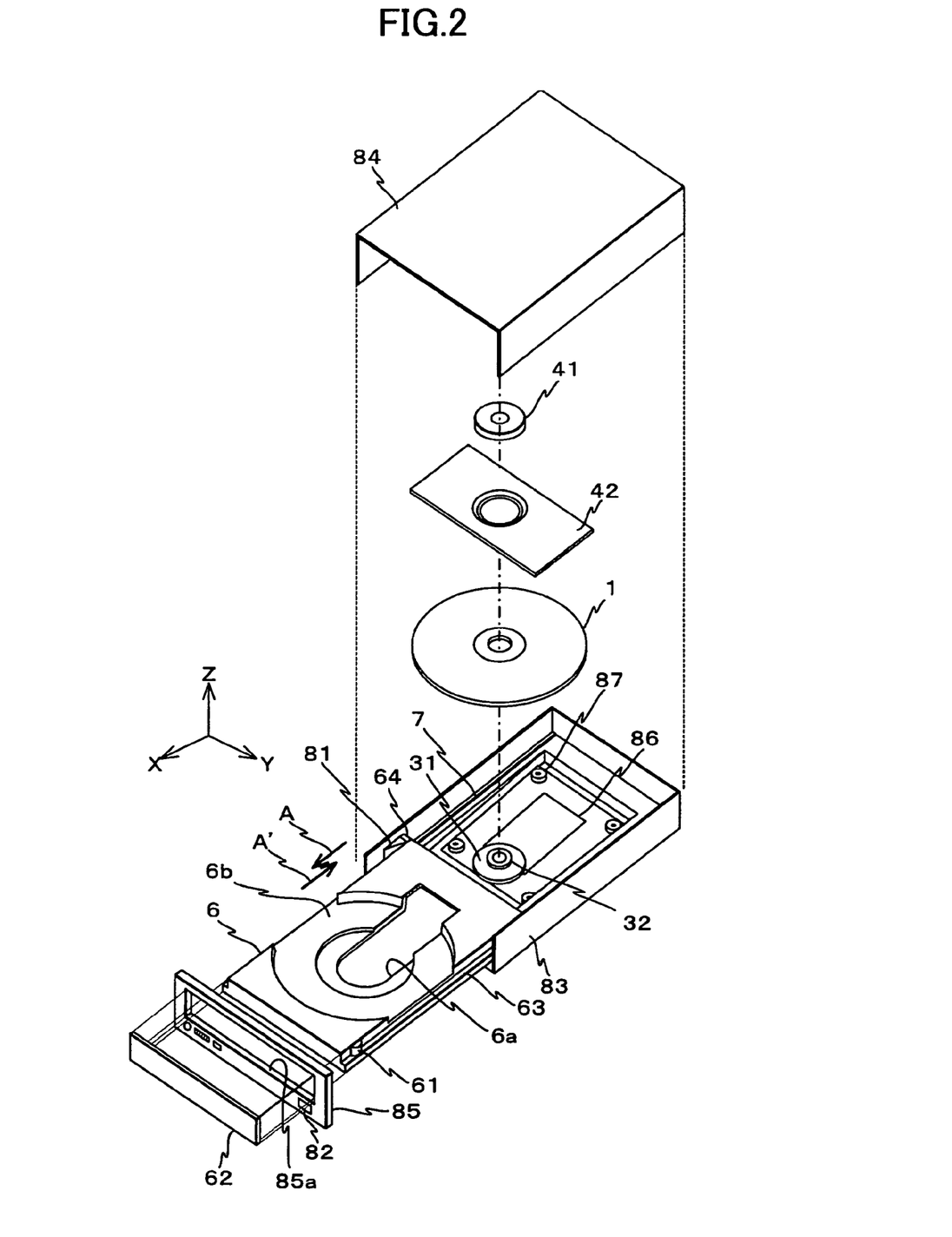
FIG. 2 is an exploded perspective diagram showing the principal parts of the disk drive device of FIG. 1.

FIG. 2 is an exploded perspective diagram showing the principal parts of the disk drive device of FIG. 1. As shown in FIG. 2, the housing 8 comprises the base 83, the top cover 84, and the front panel 85. The base 83 has the bottom wall and the three side walls (the ±Y sides and the −X side) which stand from the periphery of the bottom wall. The top cover 84 is attached in the state that the top cover 84 covers the top and the three side walls of the base 83. The front panel 85 is attached to the front face (+X side) of the box which is composed of the base 83 and the top cover 84.

The base 83 and the top covers 84 are the metal components which are fabricated by the sheet metal working, for example, respectively so that they can withstand the impact given from the outside. Moreover, the front panel 85 is the resin component which is fabricated by the injection molding etc., and the opening 85a is formed in the front panel 85 at the location shifted upward in the +Z direction.

The guides 7 are respectively provided inside the side walls (the ±Y sides) of the base 83 and guide the movement of the tray 6 through the tray guide portions (the ±Y sides) of the tray 6. The guides 7 are extended in the X-axis direction. Moreover, and the holding portions 81 are respectively provided inside the side walls (the ±Y sides) of the base 83 at the positions above the guides 7 (the +Z side) and near the +X side edges of the side walls of the base 83.

Figure 3:
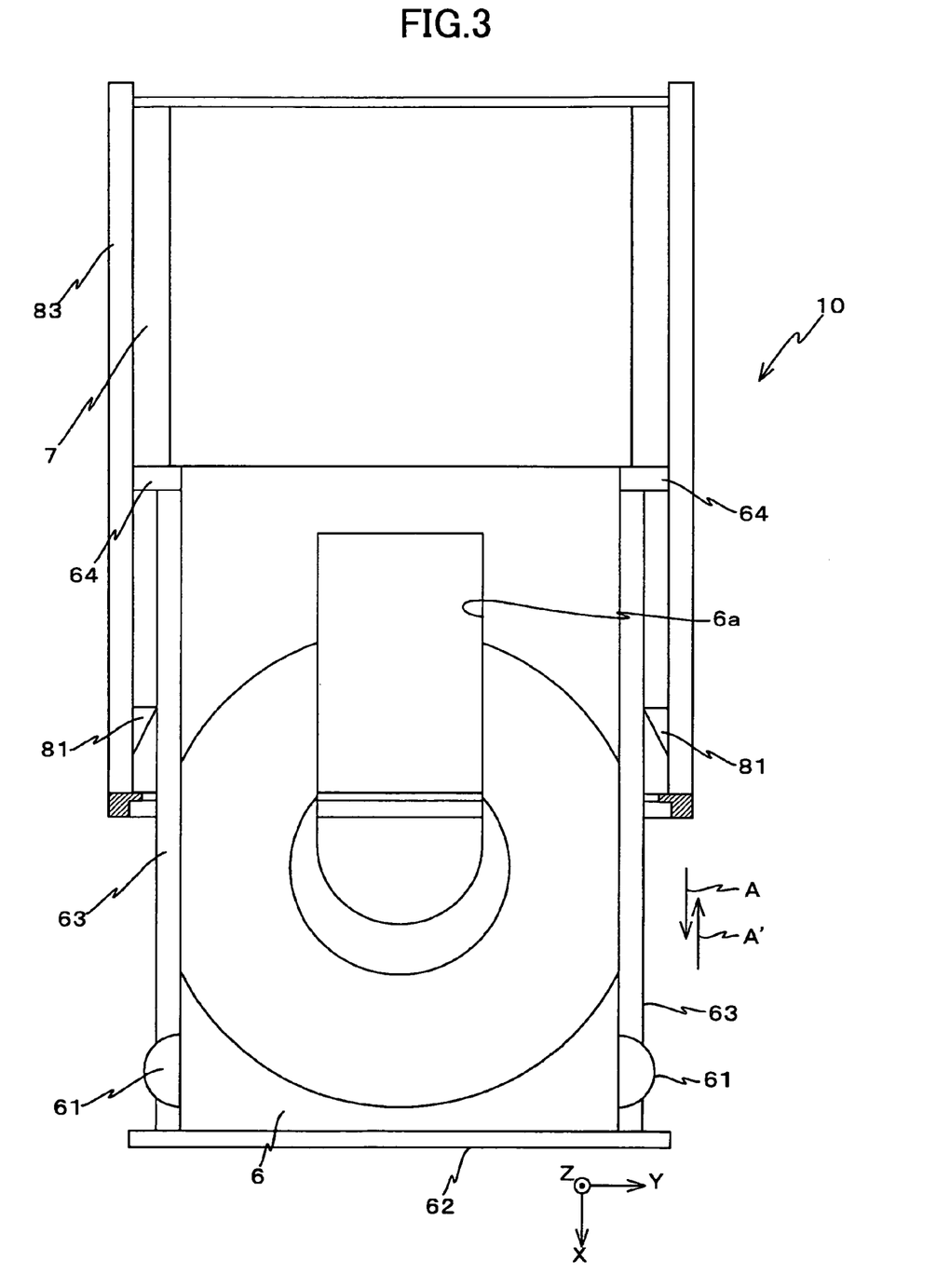
FIG. 3 is a plan view of the disk drive device of FIG. 1 when the top cover is removed and the tray is at an intermediate position between the rotation activation position and the disk-change position.

FIG. 3 is a plan view showing the state of the disk drive device 10 in which the top cover 84 is removed and the tray 6 is at an intermediate position between the first position and the second position. As shown in FIG. 3, the holding portions 81 are formed as the components having a cross section in the shape of a right angled triangle. Specifically, each holding portion 81 has a tapered surface formed thereon in which the spacing with the tray 6 becomes narrow in the inserting movement direction (A') of the tray 6. In other words, the holding portions 81 have the surface formation in which the spacing with the tray 6 becomes narrow in the inserting movement direction A' of the tray 6.

The processing unit comprises the optical pickup (not shown) provided in the base 83, the rotation mechanism (including the components 31, 32, etc. as in FIG. 2) which supports the optical disk 1 rotatably and rotates the optical disk 1 thereon, and the LSI (not shown) which includes the integrated electrical circuits for creating and processing various electrical signals.

Furthermore, the tray drive mechanism (not shown) which moves the tray 6 in the directions A and A', and the control unit (not shown) which controls the whole disk drive device 10 are accommodated in the base 83.

Moreover, as shown in FIG. 2, the chassis 86 on which the rotation mechanism is supported is disposed within the base 83, and the vibration isolating parts 87 are respectively arranged near the four corners of the chassis 86.

The rotation mechanism comprises the spindle motor (not shown), the turntable 31, the boss 32, etc. The turntable 31 is disposed at the +X side portion of the chassis 86, and the turntable 31 is rotated by the spindle motor. The boss 32 is disposed on the rotational axis of the turntable 31.

Moreover, the clamper 41 is disposed so as to counter the boss 32 via the optical disk 1. The clamper 41 is held by the damper plate 42. The ends (the ±Y sides) of the clamper plate 42 are fixed to the top parts of the side walls (the ±Y sides) of the base 83.

The door 62 is attached to the +X side end of the tray 6, and formed integrally with the tray 6. And when the tray 6 is inserted in the housing 8, the door 62 is fitted into the opening 85a of the front panel 85 so that the front portion of the disk drive device 10 apparently forms the flat surface.

The tray 6 is the resin component which is fabricated by the injection molding, etc. As shown in FIG. 1 and FIG. 2, the generally circular recesses 6b with the first and second steps are formed in the top surface (the +Z side) of the tray 6. The tray 6 is configured such that the optical disk, such as 12 cm CD, is set to the first-step recess 6b, and the optical disk, such as 8 cm CD, is set to the second-step recess 6b. In the following, these recesses 6b will be collectively referred to as the disk reception portion 6b.

Moreover, the opening 6a which penetrates the tray 6 in the Z-axis direction is formed therein so that, when the tray 6 is inserted in the housing 8, the tray 6 may not interfere with the turntable 31, the optical pickup, etc which are disposed in the base 83.

As shown in FIG. 3, the tray guide portions 63, the tray vibration isolating portions 61, and the restriction portions 64 are symmetrical disposed on the side walls (the ±Y sides) of the tray 6, respectively.

The tray guide portions 63 are engaged with the guides 7 provided in the side walls (the ±Y sides) of the housing 8 (or the base 83), respectively, so that these components serve to guide the movement of the tray 6 in the movement directions A and A'.

Each tray vibration isolating portion 61 is the component having the semi-circular cross section as shown in the plan view of FIG. 3. The tray vibration isolating portions 61 with the semicircular parts projecting outwardly are disposed near the front edge (the +X side) of the tray 6 on the side walls (the ±Y sides) of the tray 6, respectively.

Figure 4:
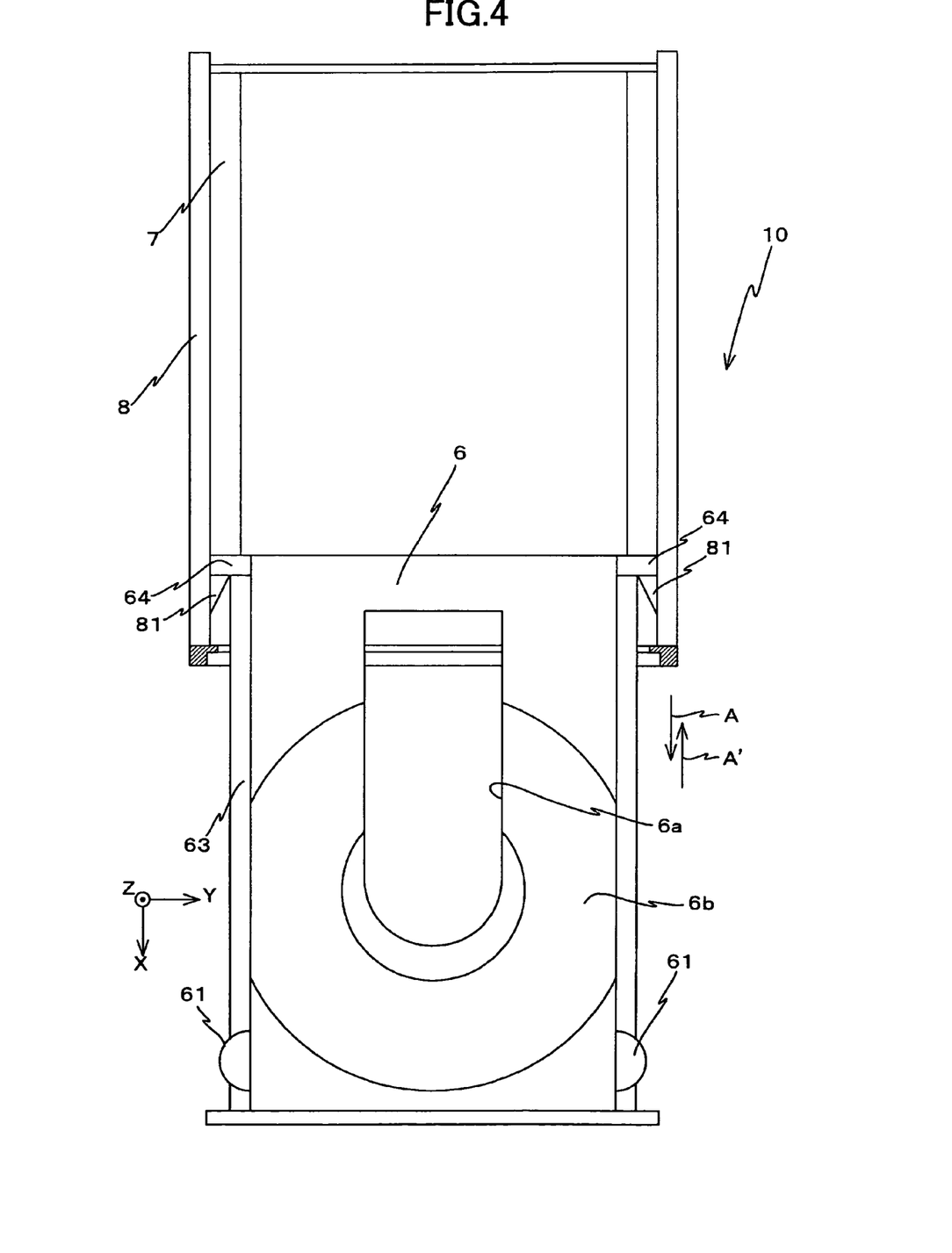
FIG. 4 is a plan view of the disk drive device of FIG. 1 when the top cover is removed and the tray is in the disk-change position.

When the tray 6 is moved in the movement direction A by the predetermined distance from the position of FIG. 3 by the tray drive mechanism so that the tray 6 reaches the first position shown in FIG. 4, the restriction portions 64 of the tray 6 are engaged with the holding portions 81 which are formed on the side walls (the ±Y sides) of the base 83, and the further movement of the tray 6 in the direction A is avoided by this engagement.

In this state, the disk reception portion 6b of the tray 6 is completely exposed to the exterior of the housing 8, and the user can set the optical disk 1 to the disk reception portion 6b, or can take out the optical disk 1 from the disk reception portion 6b. In the following, the first position of the tray 6 shown in FIG. 4 will be called the disk-change position.

Figure 5:
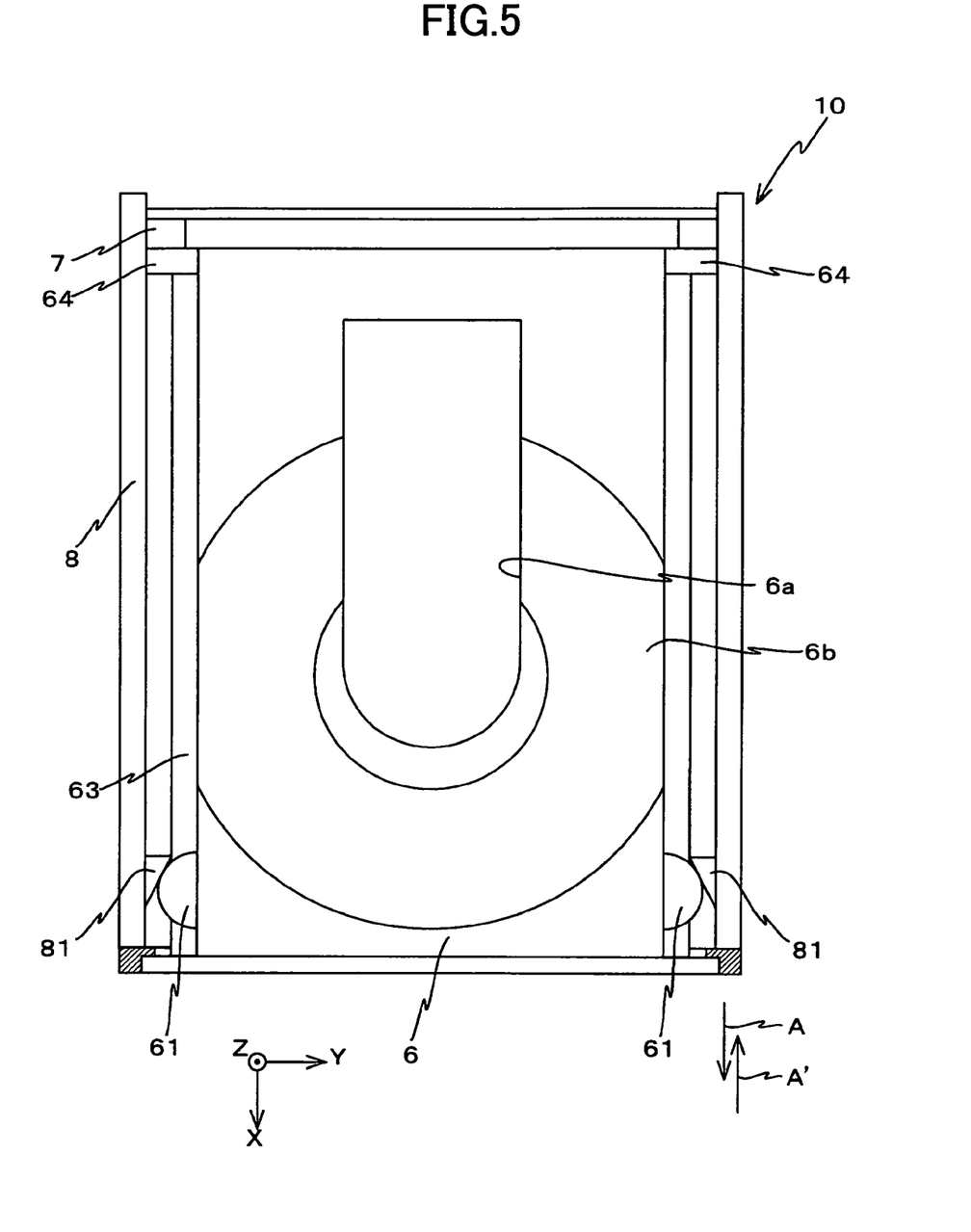
FIG. 5 is a plan view of the disk drive device of FIG. 1 when the top cover is removed and the tray is in the rotation activation position.

As the tray 6 on which the optical disk 1 is set to the disk reception portion 6b thereof is moved in the movement direction A' by the tray drive mechanism to the position shown in FIG. 5, the tray 6 is completely inserted in the housing 8.

When the tray 6 is completely contained in the housing 8, the boss 32 is located on the −Z side surface of the center hole of the optical disk 1. In the following, the position (the second position) of the tray 6 in the state of FIG. 5 will be called the rotation activation position. When the tray 6 reaches the rotation activation position, the chassis 86 is actuated to rise, so that the turntable 31 is raised relative to the optical disk 1 and the boss 32 is fitted into the center hole of the optical disk 1.

And the optical disk 1 is pushed against the turntable 31 by the clamper 41. That is, the optical disk 1 is clamped between the turntable 31 and the clamper 41.

Referring back to FIG. 1, the ejection button 82 is provided near the opening 85a of the front panel 85. If the ejection button 82 is pushed by the user, the detection signal is sent to the control unit, and the control unit drives the tray drive mechanism in accordance with the predetermined criteria.

Next, operation of the disk drive device 10 mentioned above will be explained briefly. It is assumed that the tray 6 is contained in the housing 8 and located in the rotation activation position.

When the ejection button 82 provided in the front panel 85 is pushed by the user, the tray 6 is moved in the movement direction A of FIG. 1 by the tray drive mechanism.

When the movement of the tray 6 by the predetermined distance is carried out, the restriction portions 64 formed on the side walls of the tray 6 are respectively engaged with the holding portions 81 formed on the side walls of the base 83, and the further movement of the tray 6 is avoided so that the tray 6 is set in the disk-change position.

The optical disk 1 is set to the disk reception portion 6b of the tray 6 by the user in the state where the tray 6 is in the disk-change position. Or if the optical disk 1 is already set to the disk reception portion 6b, it is exchanged with the new optical disk 1. Thereafter, when the ejection button 82 is pushed by the user or when the door is slightly pushed in the direction A', the tray 6 is moved in the movement direction A' by the tray drive mechanism.

Subsequently, when the tray 6 is moved to the rotation activation position inside the housing 8, the driving operation of the tray drive mechanism is suspended. At this time, as shown in FIG. 5, the tray vibration isolating portions 61 provided on the side walls of the tray 6 are engaged with the holding portions 81 and 81 provided on the side walls of the base 83, respectively, so that the tray 6 is fixed to the housing 8. In other words, the tray 6 is locked to the side walls of the housing 8 at this time.

Subsequently, the control unit controls the disk drive device 10 so that the laser beam from the optical pickup is irradiated to the optical disk 1 while the optical disk 1 is rotated by the spindle motor. The control unit performs the detection of the light reflected from the optical disk 1, and the signal processing to convert the light into the electrical signal etc. Then, the spindle motor is stopped by the control unit after the disk information, the file-management information, etc. which are recorded in the predetermined region of the optical disk 1 are read out through the LSI.

Subsequently, the laser beam from the optical pickup is irradiated to the optical disk 1 while the optical disk 1 is rotated in response to the operation start command given by the user, so that recording, reproducing or erasing of the user data to the optical disk 1 is carried out.

As described above, in the disk drive device 10 of the present embodiment, the plurality of locking units which lock the tray 6 to the walls of the housing 8 are constituted by the sets of the tray vibration isolating portions 61 and the holding portions 81 which are engaged with each other when the tray 6 is in the rotation activation position. Moreover, in the disk drive device 10 of the present embodiment, the disk rotation device is constituted by the components parts of the disk drive device 10 excluding the above-mentioned processing unit, such as the optical pickup.

According to the disk drive device 10 of the above-described embodiment, when the tray 6 is in the rotation activation position (the second position) inside the housing 8, the tray vibration isolating portions 61 (part of the locking unit) are engaged with the holding portions 81 (part of the locking unit), and the tray 6 is locked to the side walls of the housing 8 where each side of the tray faces the housing side wall in the direction perpendicular to the movement direction of the tray 6. For this reason, even when the disk is rotated at high speed, swaying movement of the tray 6 can be prevented and it is possible to suppress vibrations of the tray 6 effectively.

Moreover, since each holding portion 81 is configured in the tapered surface in which the spacing with the tray 6 becomes narrow as it goes inner in the direction of the arrow A', it is possible to make the tray vibration isolating portions 61 and the holding portions 81 of the housing engaged with each other stably. For this reason, it is possible to reduce the noise accompanied with the rotation of the disk in a stable manner.

Moreover, since the tray vibration isolating portions 61 and the holding portions 81 are disposed at the two positions, respectively, the rotational vibration of the tray 6 within the XY plane can be prevented.

Moreover, since the tray vibration isolating portions 61 and the holding portions 81 are engaged with each other only when the tray 6 is in the rotation activation position (the second position) inside the housing 8, it is possible to avoid impairing the movement of the tray 6.

Moreover, when the tray 6 is moved to reach the disk-change position (the first position), the restriction portions 64 of the tray 6 are brought into contact with the corresponding holding portions 81 of the housing 8, respectively, and it is possible to prevent separation of the tray 6 from the housing 8. That is, since each holding portion 81 serves as the stopper, and there is no need to provide the disk drive device 10 with the dedicated stopper mechanism separately.

In the above-described embodiment, the holding portions 81 are formed as the components that are separate from the housing 8. The present invention is not limited to this embodiment. Alternatively, the holding portions 81 may be formed integrally with the housing 8.

In the above-described embodiment, the tray vibration isolating portions 61 are formed as the components that are separate from the tray 6. The present invention is not limited to this embodiment. Alternatively, the tray vibration isolating portions 61 may be formed integrally with the tray 6.

In the above-described embodiment, the tray vibration isolating portions 61 are disposed on the side walls (the ±Y sides) of the tray 6 respectively. The present invention is not limited to this embodiment. Alternatively, the tray vibration isolating portions 61 may be disposed on the top and bottom walls (the ±Z sides) of the tray 6 respectively as shown FIG. 6, FIG. 7 and FIG. 8.

Figure 6:
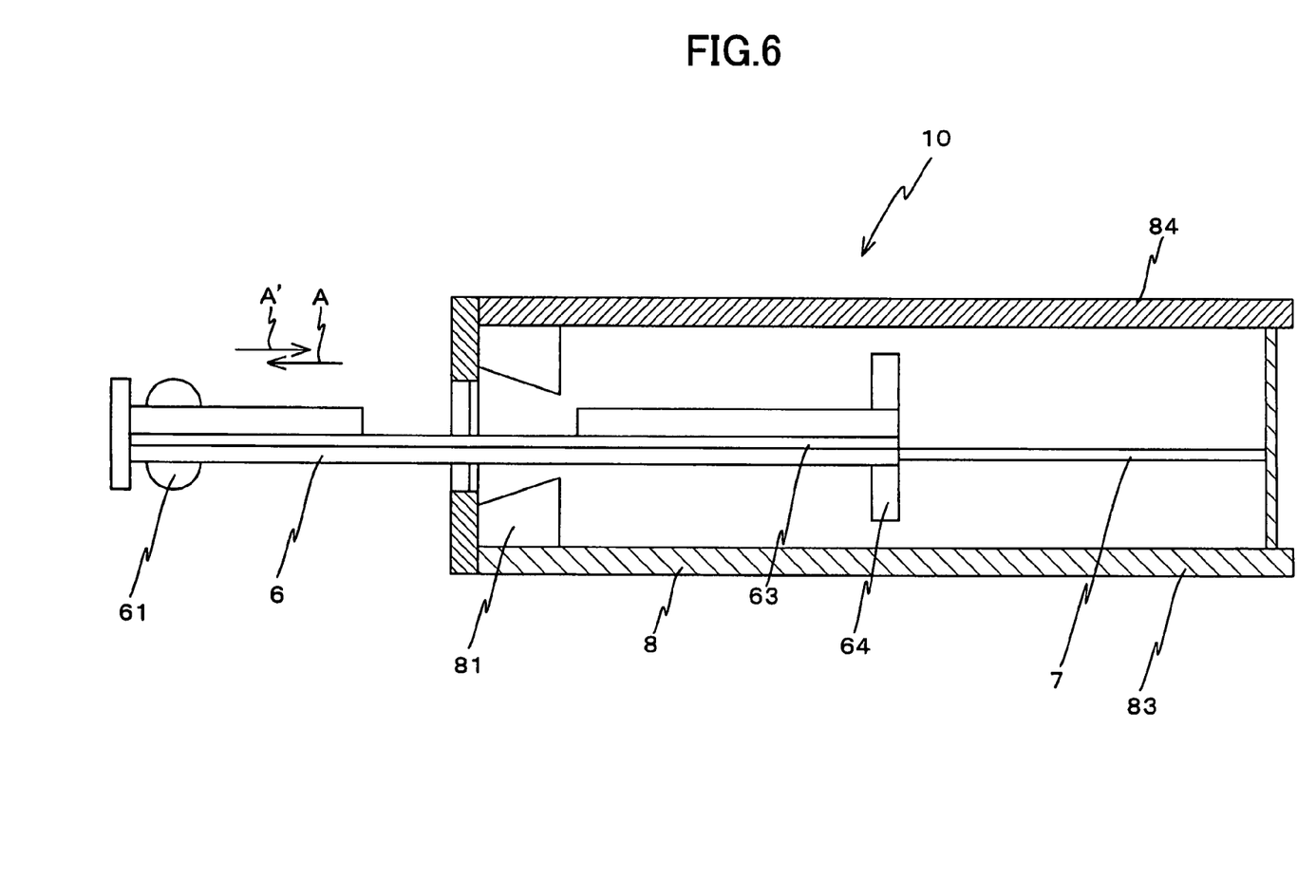
FIG. 6 is a diagram for explaining a modification of the disk drive device when the tray is at an intermediate position between the rotation activation position and the disk-change position.
Figure 7:
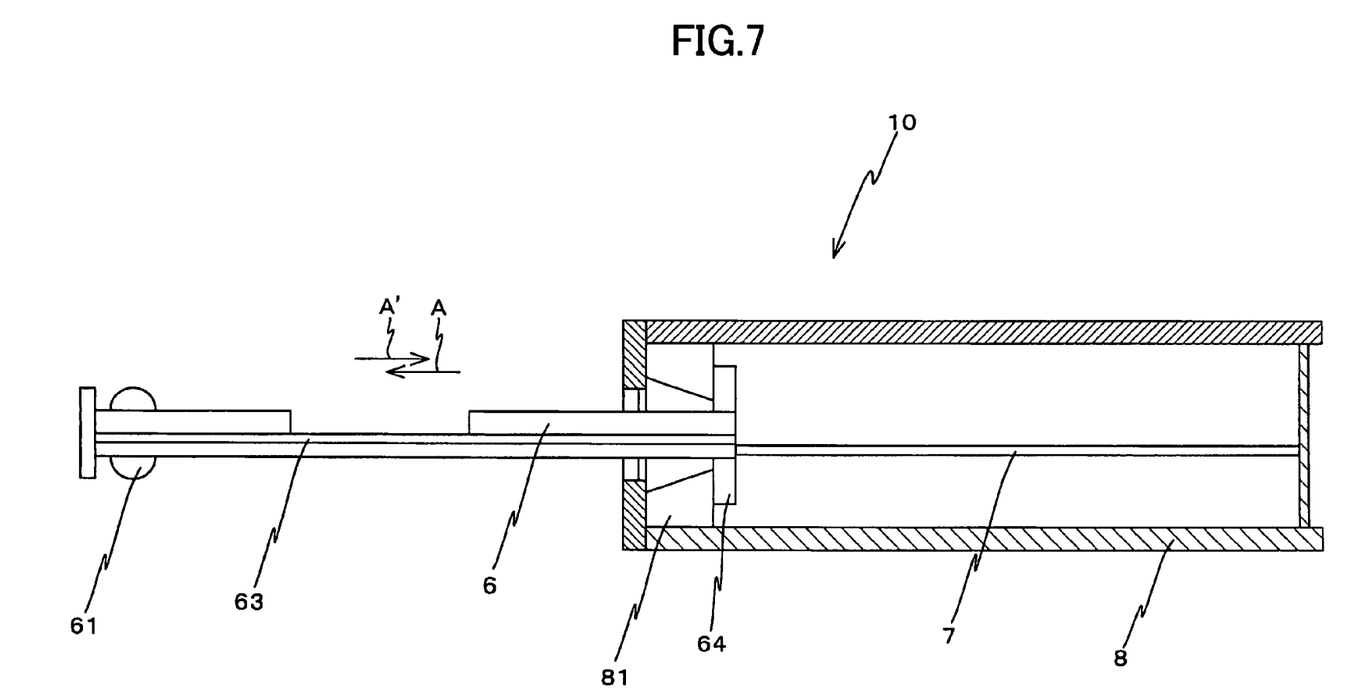
FIG. 7 is a diagram for explaining the modification of the disk drive device when the tray is in the disk-change position.
Figure 8:
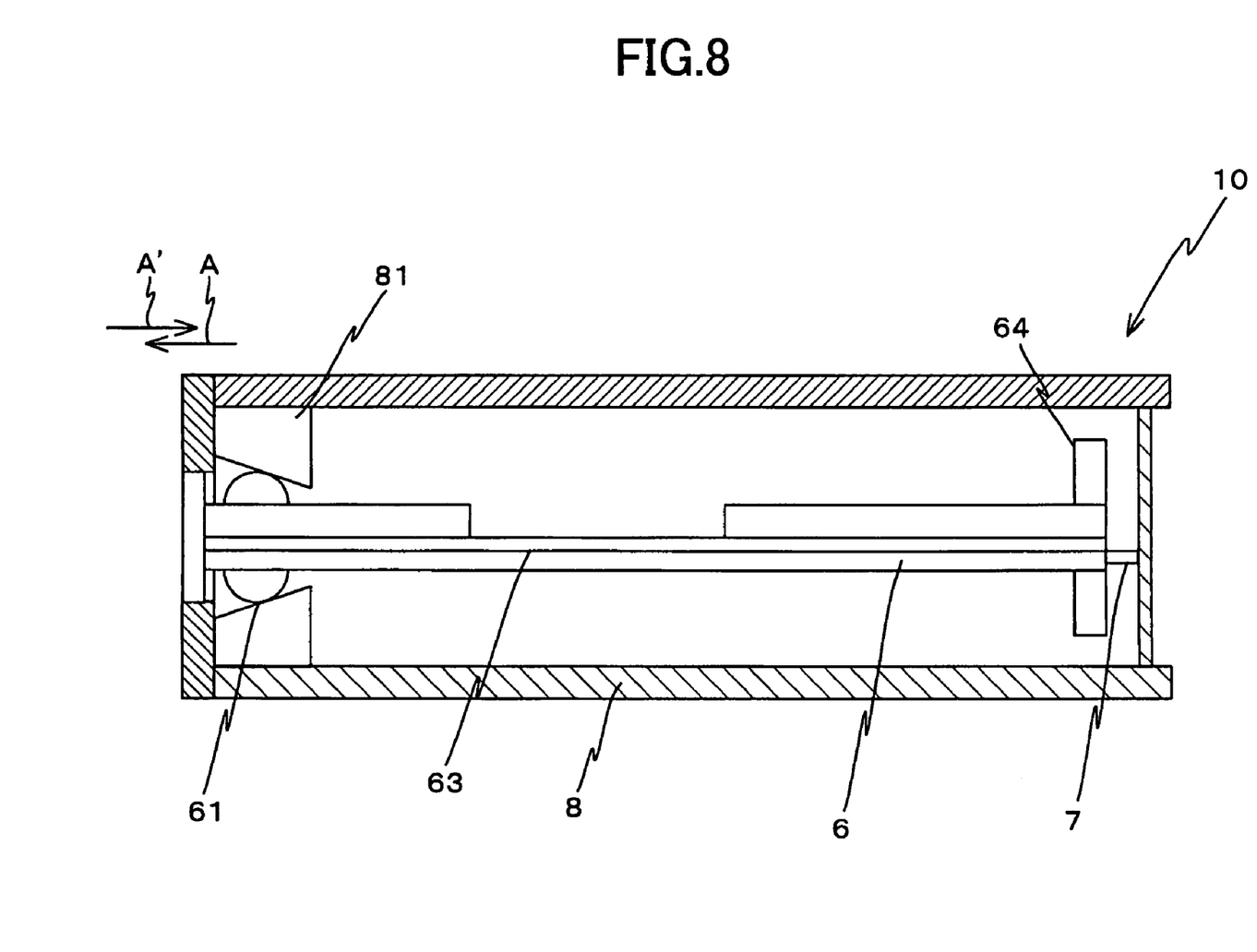
FIG. 8 is a diagram for explaining the modification of the disk drive device when the tray is in the rotation activation position.

FIG. 6 shows the composition of this modification of the disk drive device 10 when the tray is at an intermediate position between the rotation activation position and the disk-change position. FIG. 7 shows the state of this modification of the disk drive device 10 when the tray is in the disk-change position. FIG. 8 shows the state of this modification of the disk drive device 10 when the tray is in the rotation activation position.

In this alternative embodiment, the holding portions 81 can be disposed on the top cover 84 and the bottom wall of the base 83 respectively such that they correspond to the tray vibration isolating portions 61. Moreover, the restriction portions 64 can be disposed on the top and bottom walls (the ±Z sides) of the tray 6 respectively such that they correspond to the holding portions 81. It is a matter of course that the advantageous features and effectiveness of the invention that are the same as those of the above-described embodiment of FIG. 3 through FIG. 5 can be obtained with this alternative embodiment.

Figure 9:
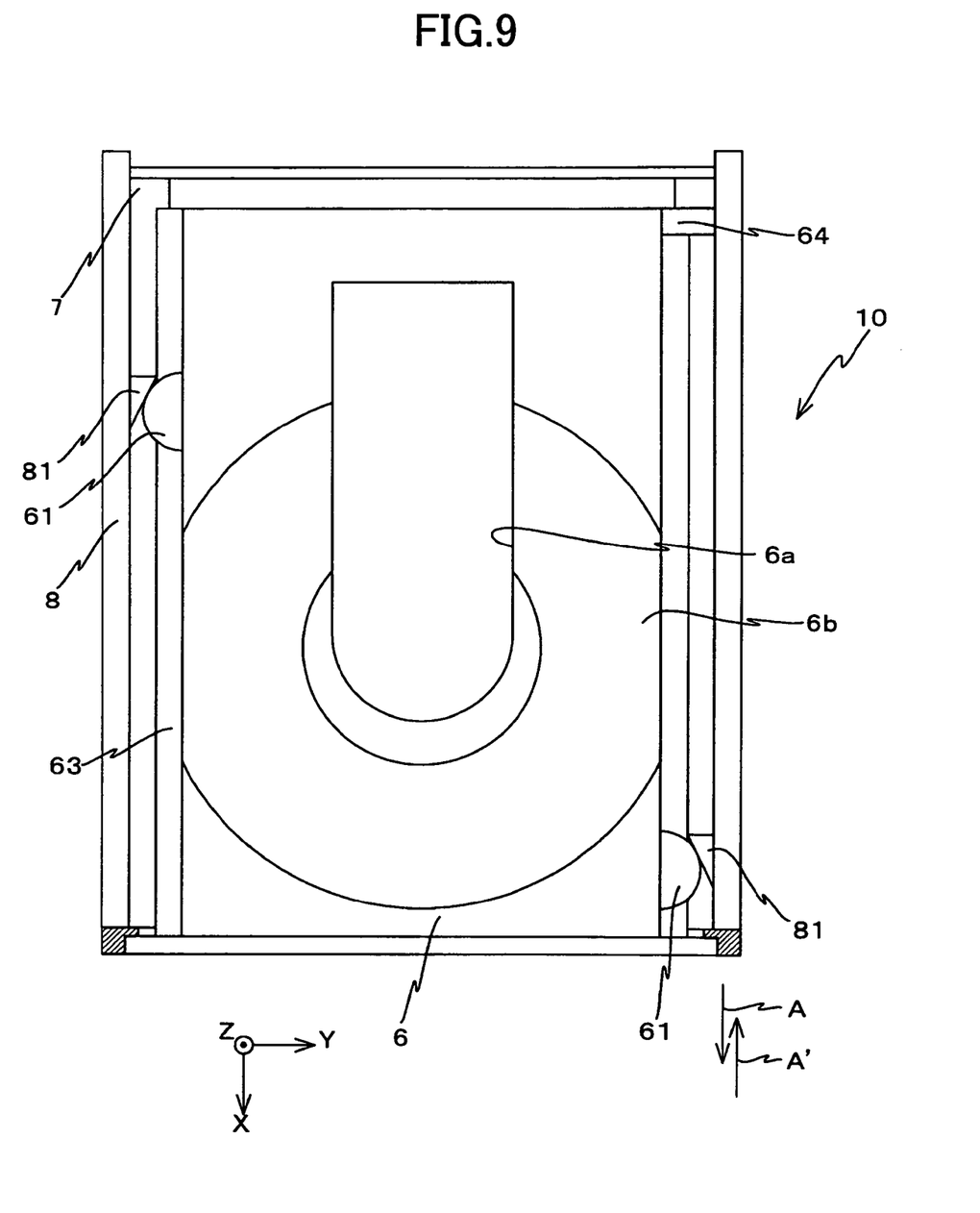
FIG. 9 is a diagram for explaining another modification of the disk drive device.

In the above-described embodiment, the restriction portions 64 are disposed on the side walls (the ±Y sides) of the tray 6 respectively. The present invention is not limited to this embodiment. Alternatively, one restriction portion 64 may be disposed on only one of the side walls (the ±Y sides) of the tray 6 as shown in FIG. 9. FIG. 9 shows the composition of this modification of the disk drive device 10. It is a matter of course that the effectiveness of prevention of the tray separation that is the same as that of the above-described embodiment of FIG. 3 to FIG. 5 can be acquired with this alternative embodiment.

In addition, in the case where the dedicated stopper mechanism is provided in the disk drive device, there is no need to provide the restriction portion 64.

In the above-described embodiment of FIG. 3 to FIG. 5, the tray vibration isolating portions 61 and the holding portions 81 are disposed on the side walls of the tray 6 and the side walls of the housing 8, respectively. The present invention is not limited to this embodiment. Alternatively, in the case where there is no possibility that the rotational vibration of the tray 6 within the XY plane arises, the tray vibration isolating portion 61 and the holding portion 81 may be disposed on one of the side walls of the tray 6 and one of the side walls of the housing 8 respectively. Or the tray vibration isolating portion 61 and the holding portion 81 may be disposed on one of the top and bottom walls of the tray 6 and one of the top and bottom walls of the housing 8 respectively.

In the above-described embodiment of FIG. 5, when the tray 6 is in the rotation activation position, the tray vibration isolating portions 61 of the tray 6 and the holding portions 81 of the housing 8 are engaged with each other, so that they are arranged on the same straight line parallel to the Y-axis direction. The present invention is not limited to this embodiment. Alternatively, as shown in the embodiment of FIG. 9, the tray vibration isolating portions 61 of the tray 6 and the holding portions 81 of the housing 8 may be separated with respect to the X-axis direction and arranged on the diagonal line which is slanted to the Y-axis direction.

In the above-described embodiment of FIG. 3 to FIG. 5, the tray vibration isolating portions 61 and the holding portions 81 which are engaged with each other are disposed on the side walls of the tray 6, respectively. The present invention is not limited to this embodiment. Alternatively, two or more sets of the tray vibration isolating portions 61 and the holding portions 81 may be disposed on only one of the side walls of the tray 6.

In the above-described embodiment of FIG. 3 to FIG. 5, the contact surface of each tray vibration isolating portion 61 which comes in contact with the corresponding holding portion 81 is the curved surface (or the semi-circular surface). Alternatively, the contact surfaces of the holding portions 81 coming in contact with the corresponding tray vibration isolating portions 61 may be formed into the curved surfaces on the contrary.

Moreover, each of the contact surfaces of the tray vibration isolating portions 61 to the holding portions 81 and the contact surfaces of the holding portions 81 to the tray vibration isolating portions 61 may be formed into the curved surfaces. In such alternative embodiment, it is possible to reduce the wearing of both the contact surfaces accompanied with the engagement, and raise the durability of the tray vibration isolating portions 61 and the holding portions 81.

Figures 10A, 10B:
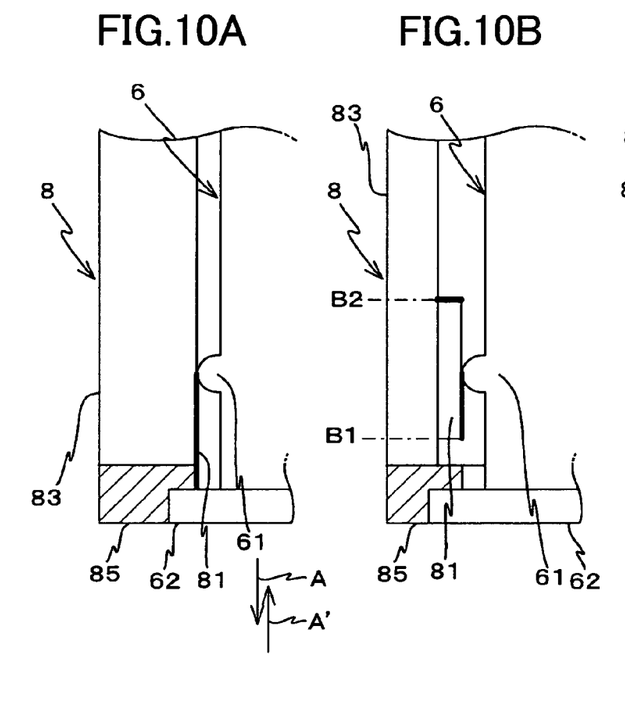
FIG. 10A through FIG. 10F are diagrams for explaining various modifications of the locking unit (the tray vibration isolating portion and the holding portion) respectively.
Figure 10C:
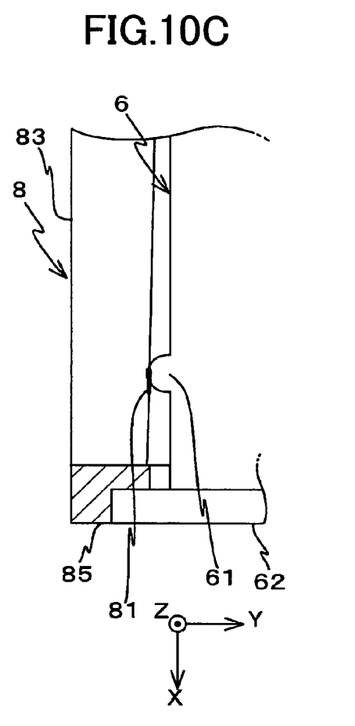
Figures 10D, 10E, 10F:
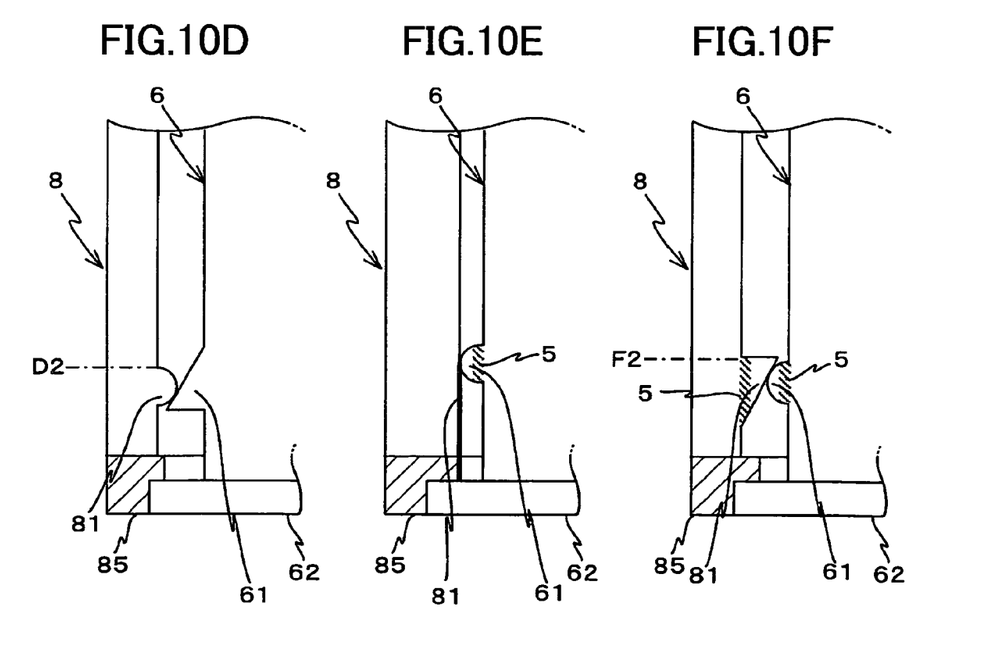

In the above-described embodiment of FIG. 3 to FIG. 5, each of the holding portions 81 has the tapered surface formed thereon in which the spacing with the tray 6 becomes narrow in the inserting movement direction A' of the tray 6. However, the present invention is not limited to this embodiment. FIG. 10A through FIG. 10 shows various modifications of the locking unit including the tray vibration isolating portion 61 and the holding portion 81.

For example, as shown in FIG. 10A and FIG. 10B, the holding portion 81 may have the flat surface. The holding portion 81 shown in FIG. 10A is integrated with the side wall of the base 83. Moreover, the holding portion 81 shown in FIG. 10B is constituted the flat surface of the raised part of the side wall of the base 83 which is configured in the shape of a terrace. In these examples, the locking action on the tray 6 is started before the tray 6 is moved to reach the rotation activation position (or at the position B1 in FIG. 10B).

In addition, when the holding portion 81 shown in FIG. 10B is disposed, the restriction portion 64 contacts the holding portion 81 at the position B-2.

Alternatively, as shown in FIG. 10C, the side wall of the base 83 may be formed into the tapered surface in which the spacing with the tray 6 becomes narrow in the −X axis direction of the tray 6. In this alternative embodiment, when the tray 6 reaches the rotation activation position, the position where the tray vibration isolating portion 61 touches serves as the holding portion 81.

In the above-described embodiment of FIG. 3 to FIG. 5, the tray vibration isolating portions 61 are the semicircular components and the holding portions 81 are the right-angled-triangle shaped components. The present invention is not limited to this embodiment. Alternatively, as shown in FIG. 10D, the holding portions 81 may be the semicircular components and the tray vibration isolating portions 61 may be the right-angled-triangle shaped components. In this alternative embodiment, the restriction portions 64 of the tray 6 contact the holding portions 81 in the position D2.

In short, what is necessary is just to have the configuration that, when the tray 6 is in the rotation activation position, the component of the force to press the tray 6 towards the central line perpendicular to the movement direction of the tray 6 is generated.

Furthermore, as shown in FIG. 10E and FIG. 10F, all or part of the tray vibration isolating portions 61 may be made of the elastic member 5. Moreover, all or part of the holding portions 81 may be made of the elastic member 5. In the alternative embodiment of FIG. 10F, the restriction portions 64 of the tray 6 contact the holding portions 81 in the position F2. According to such alternative embodiment, the vibration isolating effectiveness of the tray 6 can be further increased. For example, a rubber material may be used for the elastic member 5.

In the preferred embodiment of FIG. 1 and FIG. 2, the disk drive device 10 for accessing the optical disk in conformity with the CD type specifications has been described. The present invention is not limited to this embodiment. Alternatively, the present invention may be applied to the disk drive devices which are provided to access any of other recording media, such as the optical disk in conformity with the DVD type specifications, the optical disk in conformity with the LD (laser disk) type specifications, or the next-generation optical disk using the laser beam with the wavelength of about 405 nm.

Furthermore, the present invention is applicable to the disk drive device which is provided to access two or more kinds of the optical disks in conformity with the different specifications. Moreover, the recording medium may be the recording media other than the optical disks. In short, the present invention is applicable to the disk drive device in which at least the rotation of the recording medium is accompanied at the time of reproducing the information from the recording medium. That is, the present invention is applicable to the disk drive devices other than the optical disk drive device.

In the above-described embodiment, the disk drive device of the landscape type in which the disk loading surface of the optical disk is parallel with the horizontal surface has been described. The present invention is not limited to this embodiment. Alternatively, the present invention is applicable to the disk drive device of the portrait type in which the disk loading surface of the optical disk is perpendicular to the horizontal surface.

The present invention is not limited to the above-described embodiments, and variations and modifications may be made without departing from the scope of the present invention.

Further, the present application is based on Japanese patent application No. 2004-027883, filed on Feb. 4, 2004, the entire contents of which are hereby incorporated by reference.

What is claimed is:

1. A disk rotation device which rotates a disk, comprising:
a box-type housing having an opening at one end;
a tray which is attached to the housing and movable between a first position, located outside the housing, where the disk is placed on the tray and a second position, located inside the housing, where the disk on the tray is rotated; and
a plurality of locking units locking, when the tray is in the second position, the tray to walls of the housing where surfaces of the tray face the housing walls in a direction perpendicular to a movement direction of the tray,
wherein one of the plurality of locking units is located on one of top and bottom walls of the tray and the other locking unit is located on the other of the top and bottom walls of the tray where each wall of the tray faces one of top and bottom walls of the housing in a direction perpendicular to the movement direction of the tray and perpendicular to a surface of the disk placed on the tray.

2. A disk rotation device which rotates a disk, comprising:
a box-type housing having an opening at one end;
a tray which is attached to the housing and movable between a first position, located outside the housing, where the disk is placed on the tray and a second position, located inside the housing, where the disk on the tray is rotated; and
a plurality of locking units locking, when the tray is in the second position, the tray to walls of the housing where surfaces of the tray face the housing walls in a direction perpendicular to a movement direction of the tray,
wherein one of the plurality of locking units is located on one of top and bottom walls of the tray and the other locking unit is located on the other of the top and bottom walls of the tray where each wall of the tray faces one of top and bottom walls of the housing in a direction perpendicular to the movement direction of the tray and perpendicular to a surface of the disk placed on the tray,
wherein one of the plurality of locking units is located on one of side walls of the tray and the other locking unit is located on the other side wall of the tray where each side wall of the tray faces a side wall of the housing in the direction perpendicular to the movement direction of the tray.

3. The disk rotation device according to claim 2, wherein the projecting portion of each locking unit has a rounded configuration at a position where the projecting portion contacts the surface portion.

4. The disk rotation device according to claim 2, wherein the projecting portion of each locking unit is disposed on the tray, the surface portion of each locking unit is disposed on the housing, and the surface portion has a tapered surface in which a spacing with the tray becomes narrow in an inserting movement direction of the tray from the first position to the second position.

5. The disk rotation device according to claim 2, wherein the projecting portion of each locking unit is disposed on the housing, the surface portion of each locking unit is disposed on the tray, and the surface portion has a tapered surface in which a spacing with the tray becomes narrow in an inserting movement direction of the tray from the first position to the second position.

6. The disk rotation device according to claim 2, wherein the tray comprises a restriction portion which restricts movement of the tray to a marginal limit position toward the first position, and one of the projecting portion and the surface portion is brought into contact with the restriction portion and serves as a stopper that avoids separation of the tray from the housing.

7. The disk rotation device according to claim 2, wherein at least one of the projecting portion and the surface portion provided in one of the plurality of locking units is made of an elastic material.

8. A disk drive device comprising:
a processing unit which records information in a disk as a recording medium, and reproduces the information from the disk; and
a disk rotation device which rotates the disk during the reproduction of the information, the disk rotation device comprising: a box-type housing having an opening at one end; a tray which is attached to the housing and movable between a first position, located outside the housing, where the disk is placed on the tray and a second position, located inside the housing, where the disk on the tray is rotated; and a plurality of locking units locking, when the tray is in the second position, the tray to walls of the housing where surfaces of the tray face the housing walls in a direction perpendicular to a movement direction of the tray,
wherein one of the plurality of locking units is located on one of top and bottom walls of the tray and the other locking unit is located on the other of the top and bottom walls of the tray where each wall of the tray faces one of top and bottom walls of the housing in a direction perpendicular to the movement direction of the tray and perpendicular to a surface of the disk placed on the tray.

9. A disk drive device comprising:
a processing unit which records information in a disk as a recording medium and reproduces the information from the disk; and
a disk rotation device which rotates the disk during the reproduction of the information, the disk rotation device comprising:
a box type housing having an opening at one end;
a tray which is attached to the housing and movable between a first position, located outside the housing, where the disk is placed on the tray and a second position, located inside the housing, where the disk on the tray is rotated; and a plurality of locking units locking, when the tray is in the second position, the tray to walls of the housing where surfaces of the tray face the housing walls in a direction perpendicular to a movement direction of the tray, wherein the plurality of locking units are provided so that each locking unit comprises a projecting portion disposed on one of the housing and the tray, and a surface portion disposed on the other of the housing and the tray, the projecting portion contacting the surface portion, wherein one of the plurality of locking units is located on one of side walls of the tray and the other locking unit is located on the other side wall of the tray where each side wall of the tray faces a side wall of the housing in the direction perpendicular to the movement direction of the tray.

10. The disk drive device according to claim 9, wherein the projecting portion of each locking unit has a rounded configuration at a position where the projecting portion contacts the surface portion.

11. The disk drive device according to claim 9, wherein the projecting portion of each locking unit is disposed on the tray, the surface portion of each locking unit is disposed on the housing, and the surface portion has a tapered surface in which a spacing with the tray becomes narrow in an inserting movement direction of the tray from the first position to the second position.

12. The disk drive device according to claim 9, wherein the projecting portion of each locking unit is disposed on the housing, the surface portion of each locking unit is disposed on the tray, and the surface portion has a tapered surface in which a spacing with the tray becomes narrow in an inserting movement direction of the tray from the first position to the second position.

13. The disk drive device according to claim 9, wherein the tray comprises a restriction portion which restricts movement of the tray to a marginal limit position toward the first position, and one of the projecting portion and the surface portion is brought into contact with the restriction portion and serves as a stopper that avoids separation of the tray from the housing.

14. The disk drive device according to claim 9, wherein at least one of the projecting portion and the surface portion provided in one of the plurality of locking units is made of an elastic material.

* * * * *